(12) United States Patent
Lindsay et al.

(10) Patent No.: US 11,167,514 B2
(45) Date of Patent: Nov. 9, 2021

(54) METHOD AND APPARATUS FOR DUAL TIRE BUFFING AND HANDLING

(71) Applicant: BRIDGESTONE BANDAG, LLC, Muscatine, IA (US)

(72) Inventors: John S. Lindsay, Muscatine, IA (US); Jeremy D. Gray, Muscatine, IA (US); James A. Kendall, Jr., Muscatine, IA (US)

(73) Assignee: Bridgestone Bandag, LLC, Muscatine, IA (US)

( * ) Notice: Subject to any disclaimer, the term of this patent is extended or adjusted under 35 U.S.C. 154(b) by 267 days.

(21) Appl. No.: 16/544,476

(22) Filed: Aug. 19, 2019

(65) Prior Publication Data

US 2019/0366664 A1 Dec. 5, 2019

Related U.S. Application Data

(63) Continuation of application No. 15/633,562, filed on Jun. 26, 2017, now Pat. No. 10,427,373, which is a continuation of application No. 15/355,114, filed on Nov. 18, 2016, now Pat. No. 9,688,038.

(60) Provisional application No. 62/257,294, filed on Nov. 19, 2015.

(51) Int. Cl.
*B29D 30/54* (2006.01)
(52) U.S. Cl.
CPC ........ *B29D 30/54* (2013.01); *B29D 2030/541* (2013.01); *B29D 2030/549* (2013.01)
(58) Field of Classification Search
CPC .............. B29D 30/54; B29D 2030/541; B29D 2030/549
See application file for complete search history.

(56) References Cited

U.S. PATENT DOCUMENTS

| | | |
|---|---|---|
| 4,490,197 A | 12/1984 | Bajer |
| 4,781,233 A | 11/1988 | Williams |
| 4,902,313 A | 2/1990 | Penter |
| 5,179,806 A | 1/1993 | Brown et al. |
| 5,238,041 A | 8/1993 | Tomita et al. |
| 5,307,854 A | 5/1994 | Brewer |
| 6,745,809 B1 | 6/2004 | Mory et al. |
| 6,758,931 B1 | 7/2004 | Daugherty et al. |
| 6,899,778 B1 | 5/2005 | Gridley et al. |

(Continued)

FOREIGN PATENT DOCUMENTS

| | | |
|---|---|---|
| CN | 201151070 | 1/2008 |
| CN | 201799919 | 4/2011 |

(Continued)

*Primary Examiner* — David B. Thomas

(57) ABSTRACT

A dual tire buffing apparatus includes a turntable having a first end and an opposite second end. The turntable is rotatable about a central axis between first and second positions. A first expandable hub is rotatably coupled to the turntable proximate the first end. The first expandable hub is configured to receive a first tire casing. A second expandable hub is rotatably coupled to the turntable proximate the second end. The second expandable hub is configured to receive a second tire casing. A rasp head is positioned to operatively engage the first tire casing on the first expandable hub when the turntable is in the first position to perform a buffing operation on the first tire casing, and to operatively engage the second tire casing on the second expandable hub when the turntable is in the second position to perform a buffing operation on the second tire casing.

20 Claims, 8 Drawing Sheets

(56) References Cited

U.S. PATENT DOCUMENTS

| | | |
|---|---|---|
| 7,040,371 B2 | 5/2006 | Mory et al. |
| 7,052,568 B2 | 5/2006 | Tamura et al. |
| 8,585,843 B2 | 11/2013 | Lindsay et al. |
| 8,662,134 B2 | 3/2014 | Lindsay et al. |
| 9,623,617 B2 | 4/2017 | Henriksen |
| 9,688,038 B2 | 6/2017 | Lindsay et al. |
| 2002/0081954 A1 | 6/2002 | Mori et al. |
| 2004/0108076 A1 | 6/2004 | Mory et al. |
| 2005/0092075 A1 | 5/2005 | Saunders et al. |
| 2013/0005226 A1 | 1/2013 | Watanabe |

FOREIGN PATENT DOCUMENTS

| | | |
|---|---|---|
| CN | 102059599 A | 5/2011 |
| EP | 0 514 162 | 11/1992 |
| EP | 0 531 953 | 3/1993 |
| JP | 2012-143902 A | 8/2012 |
| WO | WO-2014/082765 A1 | 6/2014 |

METHOD AND APPARATUS FOR DUAL TIRE BUFFING AND HANDLING

CROSS-REFERENCE TO RELATED APPLICATION

This application is a continuation of U.S. patent application Ser. No. 15/633,562, filed Jun. 26, 2017, which is a continuation of U.S. patent application Ser. No. 15/355,114, filed Nov. 18, 2016, now U.S. Pat. No. 9,688,038, which claims priority to U.S. Provisional Patent Application No. 62/257,294, filed Nov. 19, 2015, all of which are incorporated herein by reference in their entireties.

TECHNICAL FIELD

The present disclosure relates generally to the field of retreading tires, and more specifically to systems and methods for buffing a tire casing to remove worn tread as part of a retreading process.

BACKGROUND

In general, retreading involves replacing the tread on worn tires. Retreading preserves approximately 90 percent of the material in worn tires. The material cost associated with retreading is substantially less than the cost of manufacturing a new tire, and retreading permits significant recycling.

In a retreading process, a tire casing may be first inspected, which may involve visual and/or machine-based (e.g., shearographic) inspection to identify non-visible damage and embedded debris (e.g., nails). If the casing passes the initial inspection, the worn tread may be removed through a process referred to as buffing.

Buffing typically may involve removing excess rubber to provide a substantially evenly-textured crown for receiving a pre-cured tread strip and to provide a predetermined tire casing profile. Tire casings typically may include a belt package (a package of steel belts or cables) underlying the road-engaging surface (e.g., the original tread) of the tire. Prior to retreading, the casing may be buffed, generally to a predetermined characteristic crown radius corresponding to the upper contour of the belt package. The casing may be buffed to leave only a predetermined thickness, e.g., 3/32 of an inch, of material remaining over the top belt. The shoulder of the casing may also be buffed (trimmed) to eliminate or reduce voids or patterns in the shoulder created by the original tread, and to provide, typically, a relatively continuous profile between the casing sidewalls and the crown. A worn casing from each of various models and sizes of new tires has a characteristic tire casing profile of a particular crown width, crown buffing radius and shoulder trim angle which may be created as an initial step in the buffing process.

After being buffed, the tire casing may then be examined for injuries, which may be skived and filled with a repair gum. After completion of the skiving process, the buffed surface may be sprayed with tire cement that provides a tacky surface for application of a suitable layer of bonding material, such as cushion gum. The cushion gum may be a layer of uncured rubber material, which optionally may include a low temperature vulcanizing agent and accelerator. The cushion gum can be placed over the crown. In some retreading operations, the spray cement can be omitted.

A cured tread strip, typically of a width corresponding to the width of the crown of the casing, may then be cut to the length corresponding to the casing circumference and disposed over the casing crown. Alternatively, continuous replacement treads in the shape of a ring (i.e., ring treads) may be used to retread the buffed casing. A roller pressing process, commonly referred to as stitching, may be performed on the assembly to force air from between the tread strip and casing.

After stitching the tire assembly, which includes the tire casing, the cushion gum and the tread, the assembly may be placed within a flexible rubber envelope. An airtight seal can be created between the envelope and the bead of the tire casing. The entire envelope, with the tire assembly disposed therein, can be placed within a curing chamber and subjected to elevated pressure and temperature for a predetermined period of time. The combination of exposure to elevated pressure and temperature for a duration of time may bind the cushion gum to both the tire casing and the new tire tread.

Buffing in the noted process may be performed by a buffing apparatus including a rasp and a tire mounted so that the rasp may come into contact with the tire's outer surface. An operator may perform an initial inspection process to analyze the current condition of a tire casing. The tire casing may then be mounted to the tire hub assembly. For example, the tire hub assembly may include a tire chuck with an expandable rim for accepting tire casings of various sizes. After buffing has been completed the operator may remove the tire and send it to another location for further processing.

Buffing and skiving processes take approximately 3 minutes per tire. Of the 3 minutes, the buffing process takes approximately 2 minutes, loading and unloading take approximately 15 seconds each, and skiving takes approximately 30 seconds. In addition, the rasp head must come to a complete stop after completing a buffing process, and must be restarted to buff the next tire. When operating at production rate, this corresponds to approximately 20 start/stop sequences per hour. Each start/stop sequence requires a substantial in-rush of current into the rasp motor in order to accelerate the rasp head to bring the rasp head up to operating speed. Energy is also needed to bring the rasp head to a stop. The start/stop sequences also stress and ultimately reduce the useful life of the components of the rasp head, thereby requiring regular maintenance.

SUMMARY

As disclosed herein, an example apparatus includes a turntable having a first end and an opposite second end. The turntable is rotatable about a central axis between a first position and a second position. A first expandable hub is rotatably coupled to the turntable proximate the first end. The first expandable hub is configured to receive a first tire casing. A second expandable hub is rotatably coupled to the turntable proximate the second end. The second expandable hub is configured to receive a second tire casing. A rasp head is positioned to operatively engage the first tire casing on the first expandable hub when the turntable is in the first position to perform a buffing operation on the first tire casing, and the rasp head is positioned to operatively engage the second tire casing on the second expandable hub when the turntable is in the second position to perform a buffing operation on the second tire casing.

As disclosed herein, another example apparatus includes a rasp pedestal. A circular track surrounds the rasp pedestal. A first carrier is operatively coupled to the track and is movable along the track between a first position and a second position. The first position is adjacent the rasp pedestal. A second carrier is operatively coupled to the track separated from the first carrier. The second carrier is movable between first and second positions. The second position is adjacent the rasp pedestal. A first expandable hub is rotatably coupled to the first carrier. The first expandable hub is configured to receive a first tire casing. A second expandable hub is rotatably coupled to the second carrier. The second expandable hub is configured to receive a second tire casing. The first expandable hub is positioned for buffing of the first tire casing when the turntable is in the first position. The second expandable hub is positioned for buffing of the second tire casing when the turntable is in the second position.

As disclosed herein, an example method includes permitting a buffing operation on a first tire casing operatively coupled to a first expandable hub. While performing the buffing operation on the first tire casing, the method includes (1) performing a skiving operation on a second tire casing operatively coupled to a second expandable hub mounted on the turntable separate from the first expandable hub; (2) unloading the second tire casing from the second expandable hub; (3) loading a third tire casing onto the second expandable hub; and (4) rotating the first expandable hub from a first position to a second position for performing a skiving operation while simultaneously rotating the second expandable hub from a second position to a first position for performing a buffing operation.

The features of the present invention will become apparent to one of ordinary skill in the art upon reading the detailed description, in conjunction with the accompanying drawings, provided herein. The embodiments provided herein are not intended to limit the invention to such embodiments, but instead are provided with the understanding that changes and modifications may be made within the scope of the claimed invention.

DETAILED DESCRIPTION

Figure 1:
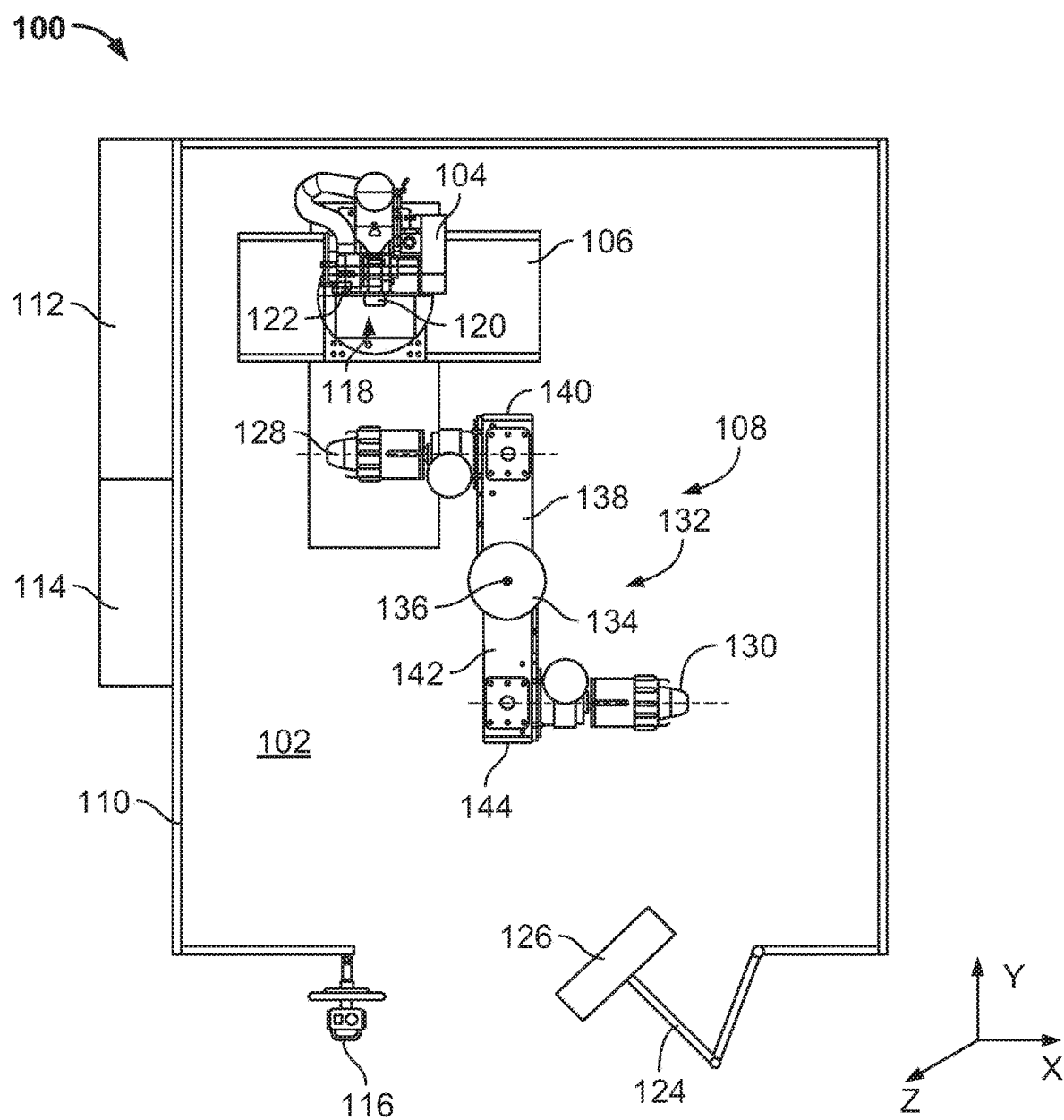
FIG. 1 is a plan view of a dual tire buffing apparatus, according to an embodiment.

FIG. 1 is a plan view of a dual tire buffing apparatus 100, according to an embodiment. The dual tire buffing apparatus 100 includes a base assembly 102, a rasp pedestal 104, a rasp pedestal moving assembly 106, fencing 110, an electrical enclosure 112, a pneumatic enclosure 114, and an human-machine interface (HMI) terminal 116. The dual tire buffing apparatus 100 also includes a dual tire hub assembly 108.

The dual tire hub assembly 108 of the dual tire buffing apparatus 100 enables multiple tire casings to be processed at the same time. As will be appreciated, the dual tire buffing apparatus 100 provides significant time and energy savings.

The rasp pedestal 104 includes a rasp head assembly 118 rotatably coupled to the rasp pedestal 104. The rasp head assembly 118 can include a rasp head 120 and a texturing device 122. The rasp head 120 is structured to remove material from the tire casing being buffed. The texturing device 122 is structured to impart a desired texture on at least a portion of the tire casing. In one embodiment, the texturing device 122 includes a wire brush. A rasp drive motor (not shown) is structured to controllably drive the rasp head assembly 118. More specifically, the rasp drive motor is structured to rotate a shaft upon which one or both of the rasp head 120 and the texturing device 122 may be mounted.

The rasp pedestal moving assembly 106 is configured to controllably move the rasp pedestal 104 relative to the dual tire hub assembly 108 along each of an X-axis, a Y-axis, and a Z-axis. In some embodiments, the rasp pedestal moving assembly 106 may be controlled automatically via a control unit (not shown) housed in the electrical enclosure 112. In other embodiments, the rasp pedestal moving assembly 106 is controlled semi-automatically or manually by an operator via the HMI terminal 116.

The fencing 110 extends around at least a portion of the rasp pedestal 104, the rasp pedestal moving assembly 106, and the dual tire hub assembly 108, so as to prevent objects from unintentionally entering or exiting the operational area of the dual tire buffing apparatus 100. The electrical enclosure 112 and the pneumatic enclosure 114, and the HMI terminal 116 may each be positioned external to the fencing 110.

The dual tire buffing apparatus 100 also includes a swing arm 124. The swing arm 124 is positioned such that the dual tire hub assembly 108 is disposed intermediate the swing arm 124 and the rasp pedestal 104. The swing arm 124 includes a secondary buffing and texturing head 126 configured to perform secondary buffing and texturizing operations on tire casings. Although not shown in FIG. 1, other embodiments may include material collection systems proximate one or both of the rasp pedestal 104 and the swing arm 124 to collect material removed from tire casings.

The dual tire hub assembly 108 of the dual tire buffing apparatus 100 also includes first and second expandable hubs 128, 130 operatively coupled to a turntable 132. The turntable 132 is rotatable between first and second positions. In each position, a buffing operation can be performed on one tire casing loaded on one of the first and second expandable hubs 128, 130, while skiving, unloading, and loading operations are performed on other tire casings on the other of the first and second expandable hubs 128, 130. Thus, a single operator can operate the dual tire buffing apparatus 100 to buff a first tire casing while skiving and unloading a second tire casing and subsequently loading a third tire casing. In many situations, skiving, unloading, and loading operations may be performed in less time than it takes to complete the buffing operation. Accordingly, the dual tire buffing apparatus 100 enables significant time savings over prior tire buffing systems. The dual tire buffing apparatus 100 configuration also enables the rasp head to be continuously rotated rather than being stopped between each buffing process. Accordingly, the dual tire buffing apparatus 100 also provides energy savings over prior tire buffing systems, while further reducing wear and tear on the rasp head.

As shown in FIG. 1, the turntable 132 includes a turntable hub 134, which is rotatable about a central axis 136. The turntable also includes a first arm 138 extending from the turntable hub 134 to a first end 140, and a second arm 142 extending from the turntable hub 134 to a second end 144 opposite the first end 140. In some embodiments, the first and second arms 138, 142 are defined by a single elongate member. The first and second arms 138, 142 are rigidly coupled to the turntable hub 134 such that rotation of the turntable hub 134 causes corresponding rotation of the first and second arms 138, 142 of the turntable 132, and therefore, of the first and second expandable hubs 128, 130.

The turntable 132 is shown in FIG. 1 in the first position. In the first position, the first expandable hub 128 is positioned proximate the rasp pedestal 104. In the first position, the rasp head 120 is configured to engage a first tire casing (not shown) on the first expandable hub 128 to perform a buffing operation on the first tire casing. In addition, the second expandable hub 130 is positioned proximate the swing arm 124 so as to perform skiving and unloading operations on a second tire casing (not shown) on the second expandable hub 130, and to subsequently load a third tire casing (not shown) onto the second expandable hub 130.

Figure 2:
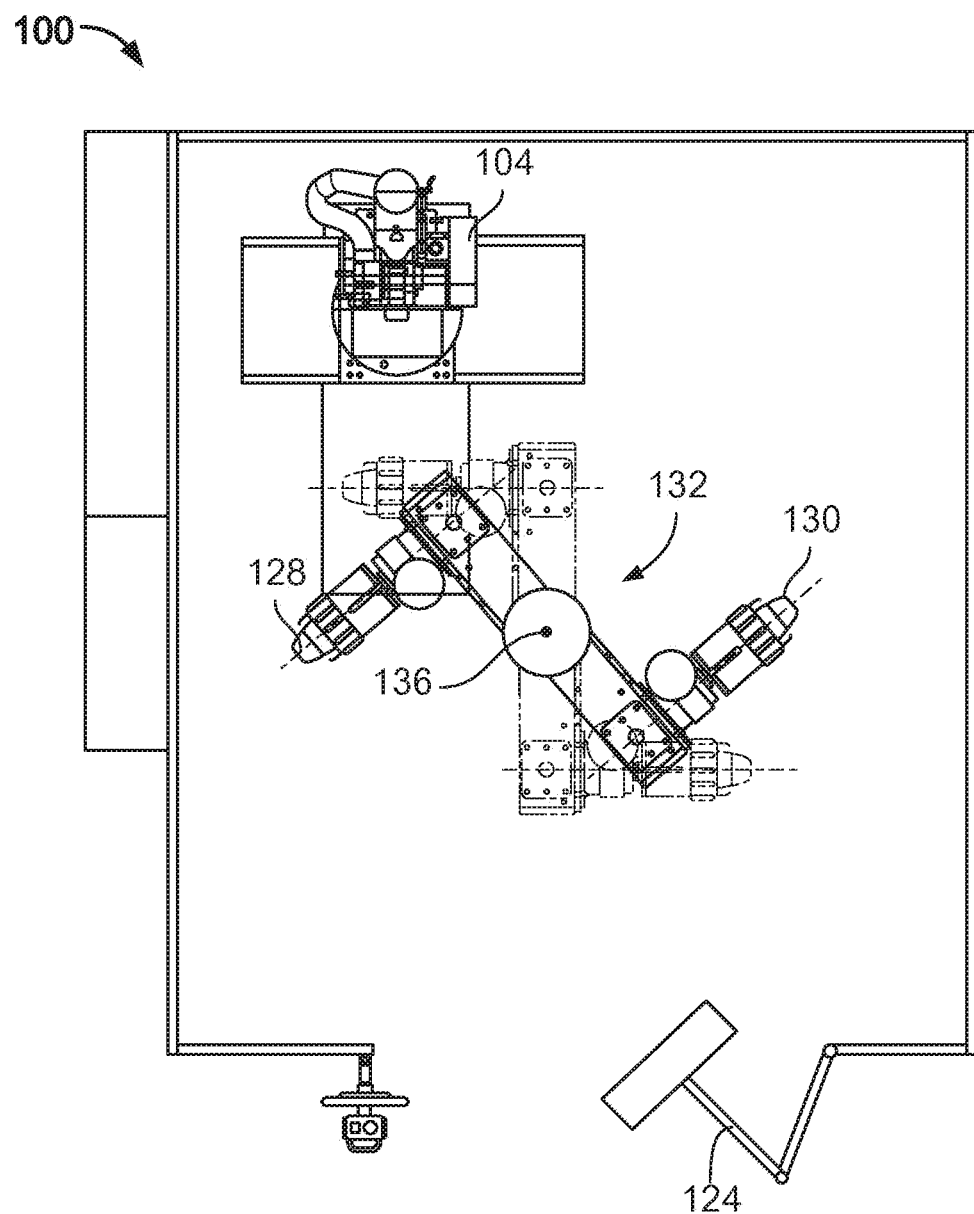
FIG. 2 illustrates the turntable of the dual tire buffing apparatus of FIG. 1 as partially rotated between the first and second positions.

FIG. 2 illustrates the turntable 132 of FIG. 1 as partially rotated between the first and second positions. More specifically, the turntable 132 is being rotated counter-clockwise about the central axis 136 so that the first expandable hub 128 moves towards the swing arm 124, and the second expandable hub 130 moves towards the rasp pedestal 104. In other embodiments, the turntable 132 rotates clockwise. In some embodiments, the turntable 132 is configured for 360 degree rotation. In other embodiments, the turntable 132 is configured for 180 degree rotation. In one embodiment, rotation between the first and second positions may take about six seconds. In another embodiment, rotation between the first and second positions may take less than ten seconds.

Figure 3:
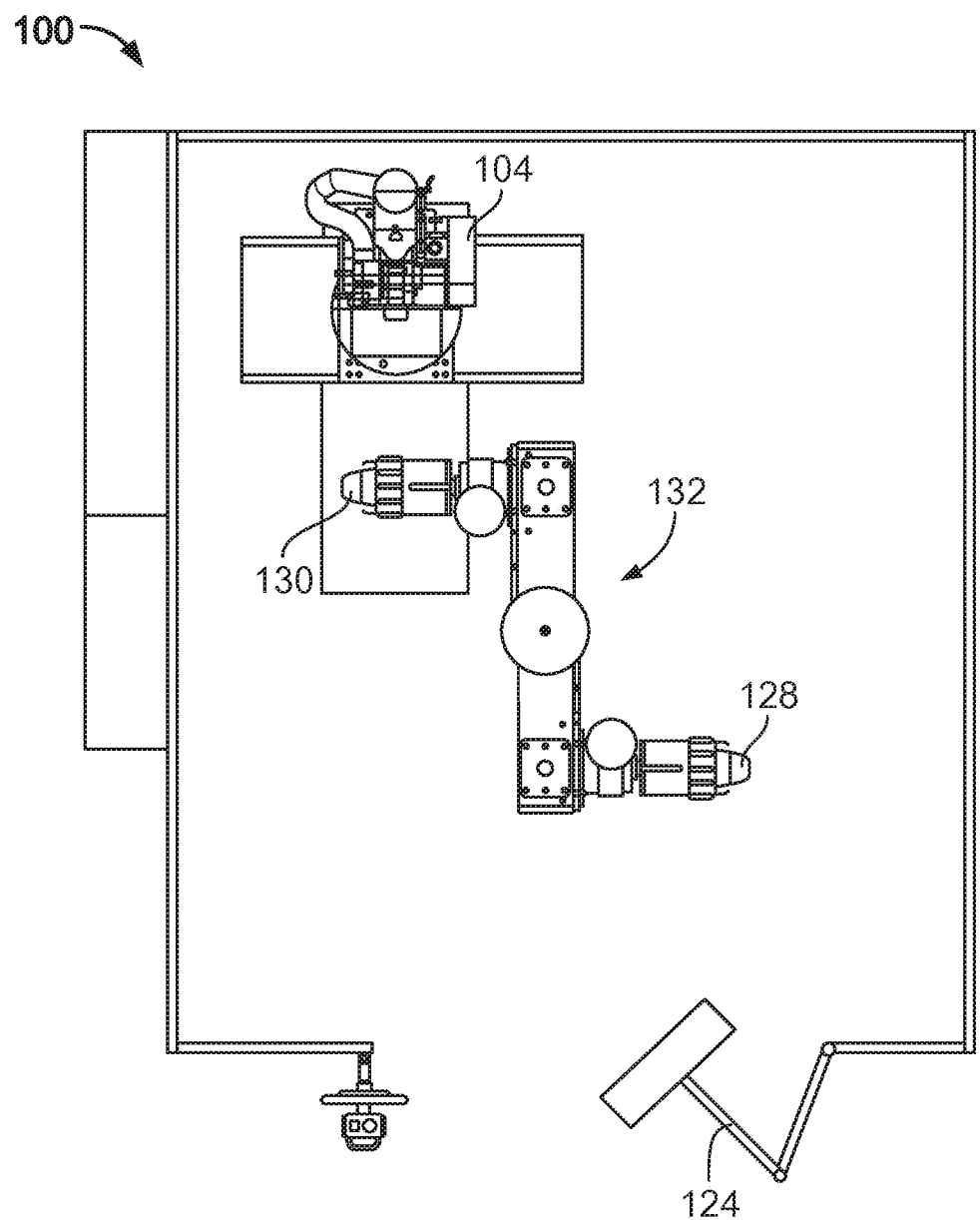
FIG. 3 illustrates the turntable of the dual tire buffing apparatus of FIGS. 1 and 2 in the second position.

FIG. 3 illustrates the turntable 132 of FIGS. 1 and 2 in the second position. As illustrated in FIG. 3, the first expandable hub 128 is positioned proximate the swing arm 124, and the second expandable hub 130 is positioned proximate the rasp pedestal 104. It can be seen that the position of the first and second expandable hubs 128, 130 is switched between the first and second positions.

With reference to FIGS. 1-3, various arrangements of the dual tire buffing apparatus 100 will be described in reference to first, second, and third tire casings. It should be understood that the first tire casing is operatively coupled to the first expandable hub 128. The second tire casing is operatively coupled to the second expandable hub 130. The second tire casing should be understood to have already completed a buffing process by the rasp head 120. The third tire casing should be understood as being next in queue to be processed after the first and second tire casings.

The rasp head 120 is positioned to operatively engage the first tire casing on the first expandable hub 128 when the turntable 132 is in the first position to perform a buffing operation on the first tire casing, and to operatively engage the second tire casing on the second expandable hub 130 when the turntable 132 is in the second position to perform a buffing operation on the second tire casing. The rasp head 120 is rotated relative to the rasp pedestal 104 to perform the buffing operation. In some embodiments, the rasp head is continuously rotated while performing buffing operations on a plurality of tire casings.

The first expandable hub 128 is positioned for skiving of the first tire casing when the turntable 132 is in the second position (FIG. 3), and the second expandable hub is positioned for skiving of the second tire casing when the turntable 132 is in the first position (FIG. 1). The first expandable hub 128 is configured to accept and release the first tire casing when the turntable 132 is in the second position (FIG. 3). The second expandable hub is configured to accept and release the second tire casing when the turntable 132 is in the first position (FIG. 1).

The swing arm 124 is positioned to operatively engage the second tire casing on the second expandable hub 130 when the turntable 132 is in the first position (FIG. 1), and to operatively engage the first tire casing on the first expandable hub 128 when the turntable 132 is in the second position (FIG. 3). The swing arm 124 may be configured to impart a predetermined texture upon the shoulders of each of the first and second tire casings.

Figure 4:
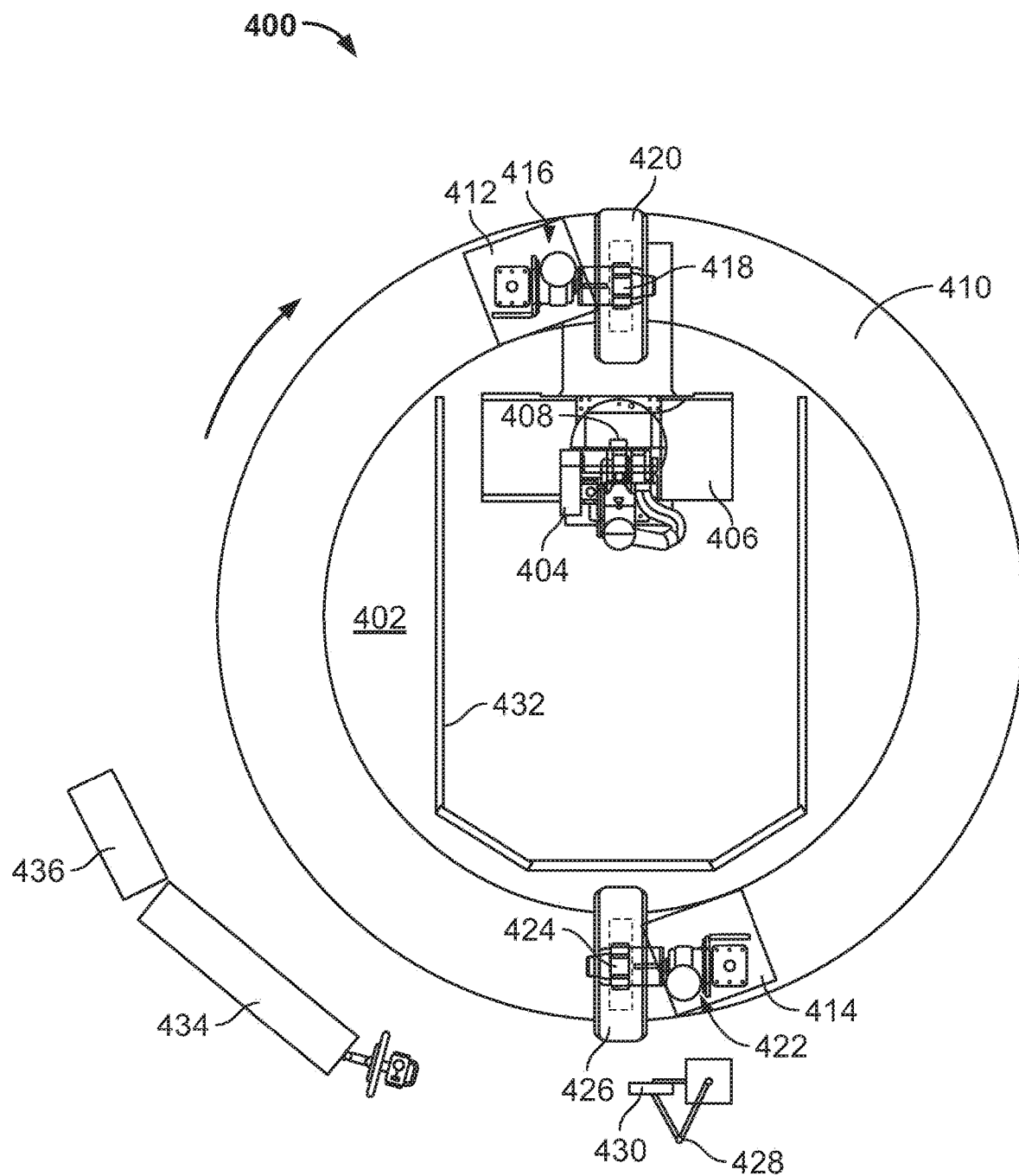
FIG. 4 is a plan view of a dual tire buffing apparatus, according to another embodiment.

FIG. 4 is a plan view of a dual tire buffing apparatus 400, according to another embodiment. As shown in FIG. 4, the dual tire buffing apparatus 400 includes a base assembly 402, a rasp pedestal 404 and rasp pedestal moving assembly 406. The rasp pedestal moving assembly 406 is mounted to the base assembly 402, and the rasp pedestal 404 is mounted to the rasp pedestal moving assembly 406. The rasp pedestal 404 includes a rasp head 408 rotatably coupled to the rasp pedestal 404.

The dual tire buffing apparatus 400 also includes a circular track 410 surrounding the rasp pedestal 404 and the rasp pedestal moving assembly 406. First and second carriers 412, 414 are operatively coupled to the track 410 on opposite sides thereof. The first and second carriers 412, 414 are movable on the track 410 between first and second positions. In the first position, the first carrier 412 is adjacent the rasp pedestal 404. In the second position, the second carrier 414 is adjacent the rasp pedestal 404.

A first hub assembly 416 including a first expandable hub 418 is mounted to the first carrier 412, such that the first expandable hub 418 is rotatable relative to the first carrier 412. The first expandable hub 418 is configured to receive a first tire casing 420. A second hub assembly 422 including a second expandable hub 424 is mounted to the second carrier 414, such that the second expandable hub 424 is rotatable relative to the second carrier 414. The second expandable hub 424 is configured to receive a second tire casing 426.

The dual tire buffing apparatus 400 also includes a swing arm 428. The swing arm 428 is positioned outside of the track 410 opposite the rasp pedestal 404. The swing arm 428 includes a secondary buffing and texturing head 430 configured to perform secondary buffing and texturizing operations on tire casings.

The dual tire buffing apparatus 400 may also include fencing 432 at least partially surrounding the rasp pedestal 404 so as to prevent objects from objects from unintentionally entering or exiting the operational area proximate the rasp pedestal 404. According to an embodiment, as illustrated in FIG. 4, the fencing 432 may be disposed inside of the track 410 such that the track 410 surrounds the fencing 432. The swing arm 428, as well as electrical and pneumatic enclosures 434, 436, may be disposed external to the track 410.

Similar to the dual tire buffing apparatus 100 of FIGS. 1-3, the dual tire buffing apparatus 400 of FIG. 4 is configured to perform a buffing operation on one tire casing loaded on one of the first and second expandable hubs 418, 424, while simultaneously performing skiving, unloading, and loading operations on other tire casings on the other of the first and second expandable hubs 418, 424. For example, the dual tire buffing apparatus 400 is shown in FIG. 4 in the first position.

In the first position, the first carrier 412 is positioned proximate the rasp pedestal 404 and the second carrier 414 is positioned proximate the swing arm 428. Accordingly, in the first position, the first tire casing 420 mounted to the first expandable hub 418 is positioned to undergo a buffing operation, and the second tire casing 426 mounted to the second expandable hub 424 is positioned to undergo a skiving operation and to be unloaded. A third tire casing (not shown) may subsequently be loaded and mounted onto the second expandable hub 424.

Figure 5:
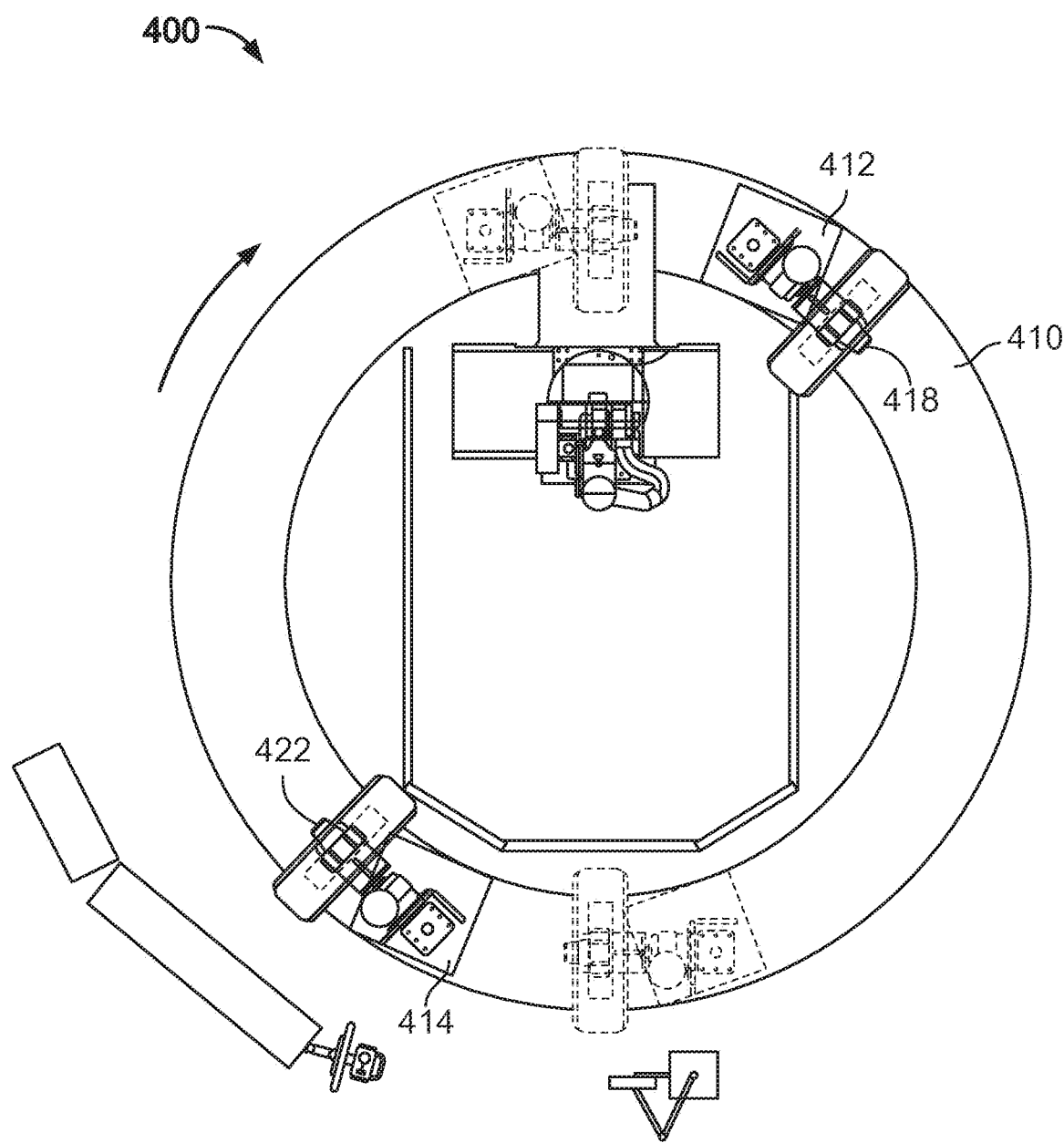
FIG. 5 illustrates the first and second carriers the dual tire buffing apparatus of FIG. 4 as partially rotated between the first and second positions.

FIG. 5 illustrates the dual tire buffing apparatus 400 of FIG. 4, with the first and second carriers 412, 414 of FIG. 4 shown as partially rotated between the first and second positions. More specifically, the first and second carriers 412, 414 are being rotated clockwise along the track 410 so that the first expandable hub 418 moves towards the swing arm 428, and the second expandable hub 424 moves towards the rasp pedestal 404. In other embodiments, the first and second carriers 412, 414 rotate counter-clockwise. In some embodiments, the first and second carriers 412, 414 are configured for 360 degree rotation around the track 410. In other embodiments, the first and second carriers 412, 414 are configured for 180 degree rotation along the track 410. In one embodiment, rotation between the first and second positions takes six seconds. In another embodiment, rotation between the first and second positions takes less than ten seconds.

Figure 6:
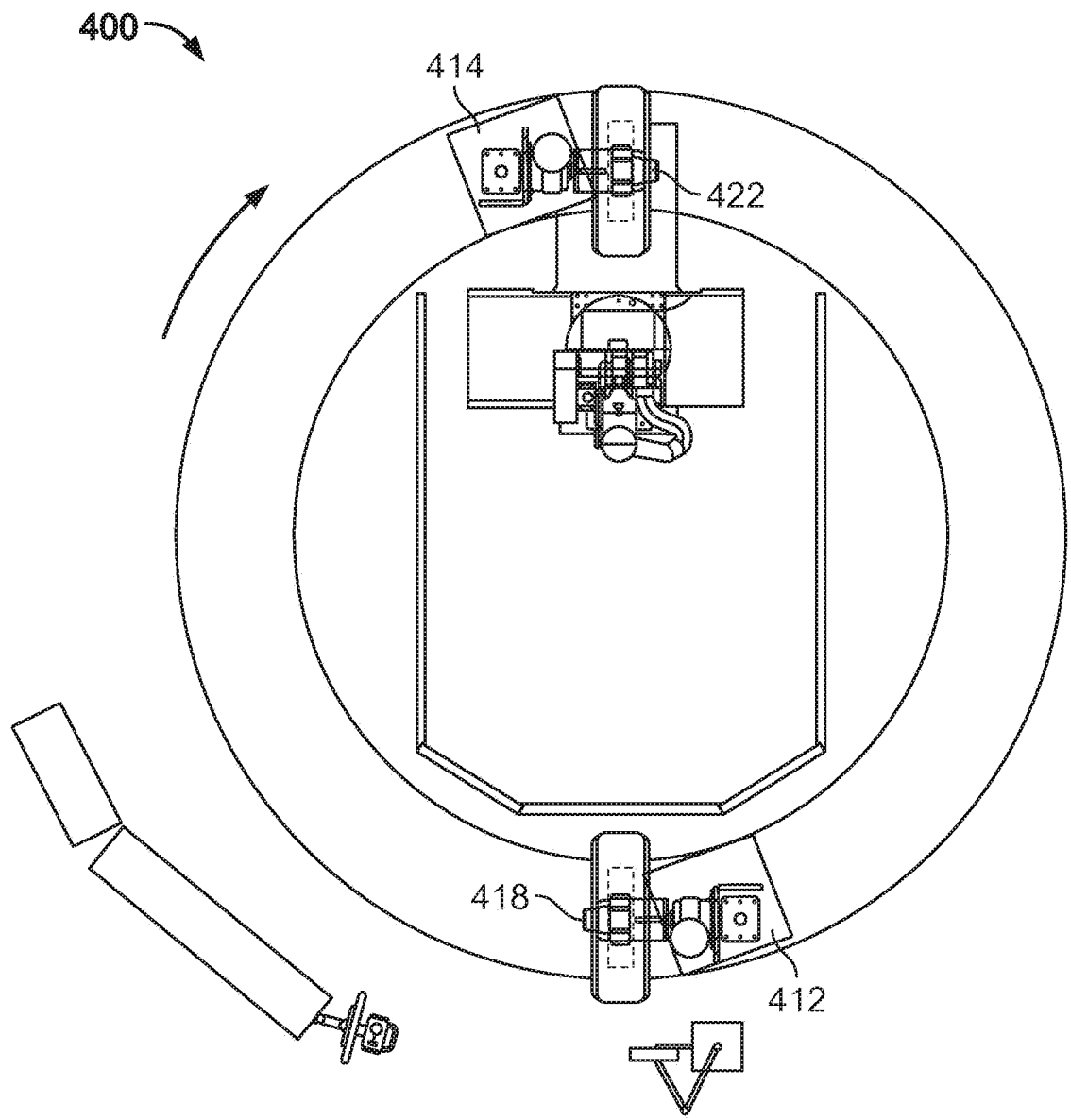
FIG. 6 illustrates the first and second carriers of the dual tire buffing apparatus of FIGS. 4 and 5 in the second position.

FIG. 6 illustrates the first and second carriers 412, 414 of FIGS. 4 and 5 in the second position. As illustrated in FIG. 6, the first expandable hub 418 is positioned proximate the swing arm 428, and the second expandable hub 424 is positioned proximate the rasp pedestal 404. It can be seen that the position of the first and second expandable hubs 418, 424 is switched between the first and second positions.

Figure 7:
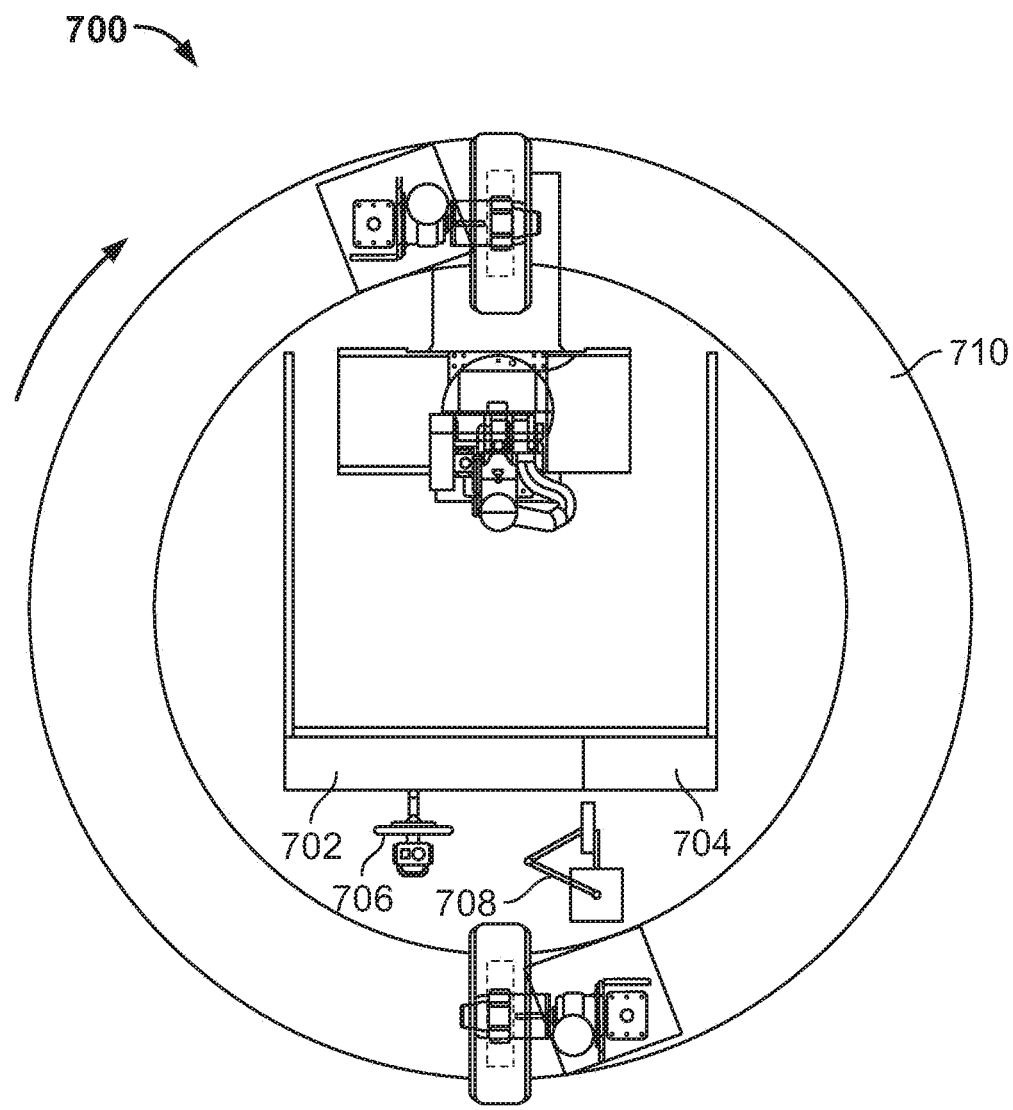
FIG. 7 is a plan view of a dual tire buffing apparatus, according to another embodiment.

FIG. 7 is a plan view of a dual tire buffing apparatus 700, according to another embodiment. As shown in FIG. 7, the dual tire buffing apparatus 700 is generally similar to the dual tire buffing apparatus 400 of FIGS. 4-6. However, the dual tire buffing apparatus 700 includes an electrical enclosure 702, a pneumatic enclosure 704, an HMI terminal 706, and a swing arm 708, each positioned inside of a track 710. In other words, the track 710 surrounds each of the electrical enclosure 702, the pneumatic enclosure 704, the HMI terminal 706, and the swing arm 708.

In another embodiment, instead of having two tire drives or hubs that rotate relative to the rasp pedestal, an example apparatus includes two stationary tire drives, and a rasp pedestal rotates relative to the tire drives. In this embodiment, an operator must walk between each tire drive to skive an unload a finished tire casing, and to load the next tire casing. In a further embodiment, tire hubs are transmitted vertically (e.g., between floors of a building) instead of rotationally on a single floor.

In other embodiments, additional carriers may be mounted to increase the number of tires in process. For example, in FIG. 4, additional carriers may be added halfway between the shown carriers so that carriers would be present at 0 degrees (first carrier 412), 90 degrees, 180 degrees (second carrier 414), and 270 degrees around the periphery.

Figure 8:
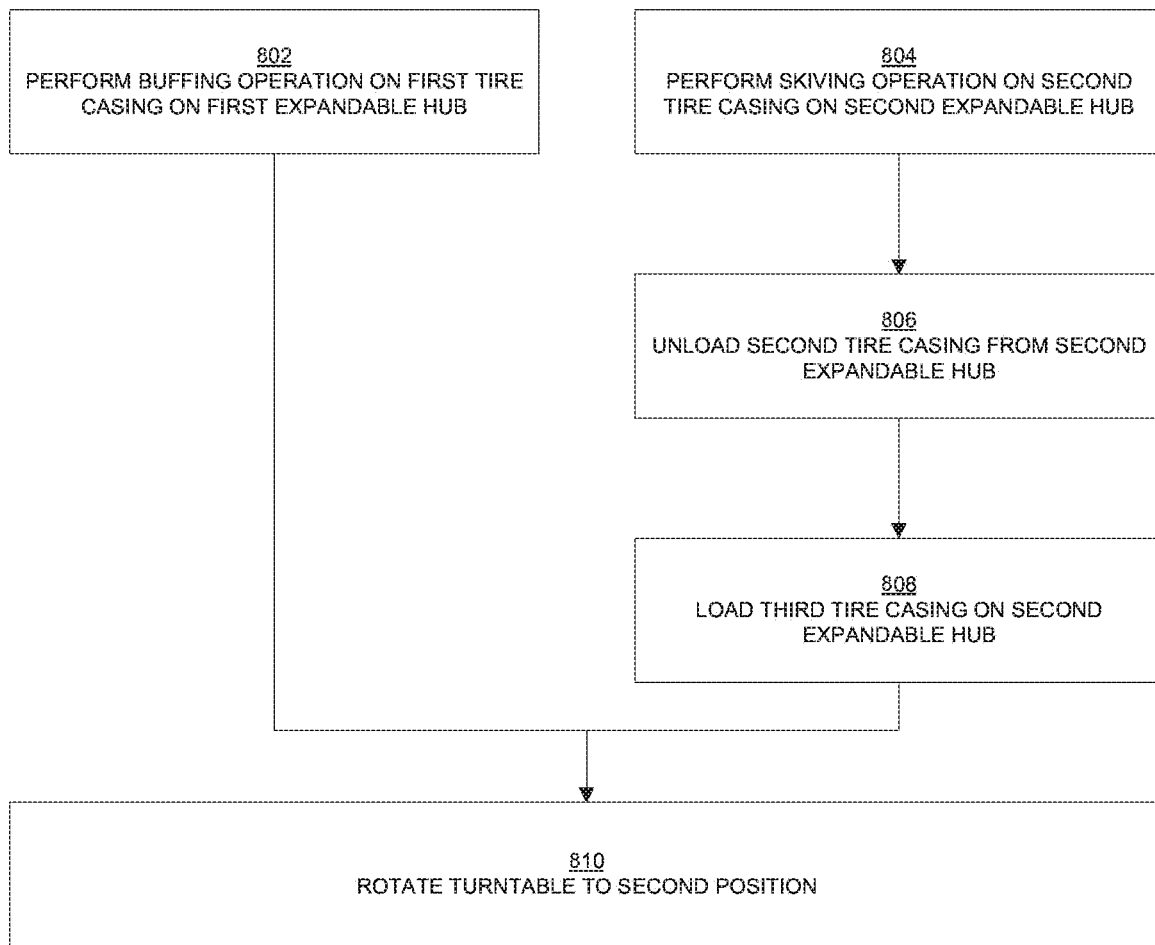
FIG. 8 is a flow diagram of a method of simultaneously performing buffing and skiving operations on tire casings, according to an embodiment.

FIG. 8 is a flow diagram of a method 800 of simultaneously performing buffing and skiving operations on tire casings, according to an embodiment. For example, the method 800 may be performed in connection with any of the dual tire buffing apparatus 100, 400, or 700 of FIGS. 1-7. However, it should be understood that the method 800 is not limited to these example embodiments.

At step 802, a buffing operation is performed on a first tire casing operatively coupled to a first expandable hub. The buffing operation may be performed by controllably engaging a rasp head with the first tire casing and moving the rasp head along a predetermined path relative to the first tire casing so as to remove worn tread from the first tire casing. The first tire casing is buffed to achieve a desired tire casing profile. The buffing operation may also include imparting a desired texture on at least a portion of the tire casing.

Steps 804-808 are performed simultaneous to step 802. At 804, a skiving operation is performed on a second tire casing operatively coupled to a second expandable hub. The second tire casing has been buffed prior to undergoing the skiving operation at 804. Skiving can involve inspecting the buffed tire casing for injuries, which are skived and filled with a repair gum. The skiving process at 804 may also include performing a secondary buffing and texturizing operation on the second tire casing.

At 806, the second tire casing is unloaded from the second expandable hub upon completion of the skiving operation at 804. Upon unloading the second tire casing from the second expandable hub, the remaining retreading processes may be performed on the second tire casing so as to provide a complete retreaded tire.

At 808, a third tire casing is loaded onto the second expandable hub. The third tire casing is in queue to be buffed and skived subsequent to the first and second tire casings.

At 810, upon completing steps 802, as well as steps 804-808, a turntable of the dual tire buffing assembly may be rotated so as to move the dial tire buffing assembly from a first position to a second position. Upon the turntable being rotated to the second position, a buffing process is performed on the third tire casing, and skiving and unloading processes are performed on the first tire casing.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise indicated.

While the invention is described herein in connection with certain preferred embodiments, there is no intent to limit the present invention to those embodiments. On the contrary, it is recognized that various changes and modifications to the described embodiments will be apparent to those skilled in the art upon reading the foregoing description, and that such changes and modifications may be made without departing from the spirit and scope of the present invention. The inventors expect skilled artisans to employ such variations as appropriate, and the inventors intend for the invention to be practiced otherwise than as specifically described herein. Accordingly, the intent is to cover all alternatives, modifications, and equivalents included within the spirit and scope of the invention. Moreover, any combination of the above-described elements in all possible variations thereof is encompassed by the invention unless otherwise indicated herein or otherwise clearly contradicted by context.

What is claimed is:

1. An apparatus, comprising:
   a base comprising a first arm extending from a central axis toward a first base end and a second arm extending from the central axis toward a second base end, the first base end opposite the second base end, wherein the base is rotatable about the central axis between a first position and a second position;
   a first hub coupled to the base proximate the first arm, the first hub configured to receive a first tire casing, the first hub coupled to the first arm such that a diameter of the first tire casing is substantially perpendicular to the first arm;
   a second hub coupled to the base proximate the second arm, the second hub configured to receive a second tire casing, the second hub coupled to the second arm such that a diameter of the second tire casing is substantially perpendicular to the second arm;
   a buffing member positioned to operatively engage the first tire casing on the first expandable hub when the base is in the first position to perform a first buffing operation on the first tire casing, the buffing member positioned to operatively engage the second tire casing on the second expandable hub when the base is in the second position to perform a second buffing operation on the second tire casing, wherein the buffing member is configured to remove worn tread.

2. The apparatus of claim 1, wherein the buffing member comprises a rasp head positioned to operatively engage the first tire casing on the first expandable hub when the base is in the first position to perform a first buffing operation on the first tire casing, the rasp head positioned to operatively engage the second tire casing on the second expandable hub when the base is in the second position to perform a second buffing operation on the second tire casing.

3. The apparatus of claim 2, wherein the rasp head is rotatably coupled to a rasp base, wherein the rasp head is rotated relative to the rasp base to perform the first and second buffing operations.

4. The apparatus of claim 2, wherein the base is configured to rotate clockwise about the central axis such that the first expandable hub moves toward second expandable hub and the second expandable hub moves toward the rasp head after completion of the first buffing operation.

5. The apparatus of claim 4, wherein the base is configured for 360 degree rotation, such that the second expandable hub moves toward first expandable hub and the first expandable hub moves toward the rasp head after completion of the second buffing operation.

6. The apparatus of claim 2, wherein the rasp head is a hanging rasp head.

7. The apparatus of claim 1, wherein the first arm and the second arm are colinear.

8. The apparatus of claim 7, wherein the base is rotatable about the central axis between a first position and a second position.

9. The apparatus of claim 8, further comprising a rasp head positioned to operatively engage the first tire casing on the first expandable hub when the base is in the first position to perform a first buffing operation on the first tire casing, the rasp head positioned to operatively engage the second tire casing on the second expandable hub when the base is in the second position to perform a second buffing operation on the second tire casing.

10. The apparatus of claim 9, wherein the base is configured to rotate clockwise about the central axis such that the first expandable hub moves toward second expandable hub and the second expandable hub moves toward the rasp head after completion of the first buffing operation.

11. The apparatus of claim 10, wherein the base is configured for 360 degree rotation, such that the second expandable hub moves toward first expandable hub and the first expandable hub moves toward the rasp head after completion of the second buffing operation.

12. The apparatus of claim 11, wherein the rasp head is a vertical buffing head.

13. The apparatus of claim 9, wherein the rasp head is a hanging rasp head.

14. The apparatus of claim 8, comprising a buffing member positioned to operatively engage the first tire casing on the first expandable hub when the base is in the first position to perform a first buffing operation on the first tire casing, the buffing member positioned to operatively engage the second tire casing on the second expandable hub when the base is in the second position to perform a second buffing operation on the second tire casing, wherein the buffing member is configured to remove worn tread.

15. An apparatus, comprising:
    a base having a first end and a second end opposite the first end, the base rotatable about a central axis, the central axis disposed between the first end and the second end;
    a first hub coupled to the base proximate the first end, the first hub configured to receive a first tire casing; and
    a second hub coupled to the base proximate the second end, the second hub configured to receive a second tire casing.

16. The apparatus of claim 15, wherein the base comprises a turntable rotatable about the central axis between a first position and a second position.

17. The apparatus of claim 16, wherein the turntable is configured for 360 degree rotation.

18. A method, comprising:
    performing a first buffing operation on a first tire casing operatively coupled to a first hub, wherein simultaneous to performing the first buffing operation on the first tire casing, a second tire casing operatively coupled to a second hub is accessible, the second hub coupled to a base proximate a second end, the first hub coupled to the base proximate a first end, wherein first end of the base is opposite the second end of the base about a central axis, the base rotatable about the central axis;
    rotating the base about the central axis; and
    performing a second buffing operation on a second tire casing operatively coupled to the second hub, wherein simultaneous to performing the second buffing operation on the second tire casing, the first tire casing operatively coupled to the first hub is accessible.

19. The method of claim 18, wherein a rasp head is positioned to operatively engage the first tire casing on the first hub to perform a first buffing operation on the first tire casing, and wherein rotating the base about the central axis comprises rotating the base about the central axis such that the first hub moves toward second hub and the second hub moves toward the rasp head.

20. The method of claim 19, further comprising:
    loading a third tire casing on the first hub; and
    rotating the base about the central axis such that the buffed second tire casing on the second hub moves toward first hub and the third tire casing on the first hub moves toward the rasp head.

* * * * *